United States Patent
Kim et al.

(10) Patent No.: US 11,784,883 B2
(45) Date of Patent: Oct. 10, 2023

(54) AUTOMATION AGENT FOR NETWORK EQUIPMENT CONFIGURATION

(71) Applicant: AT&T Intellectual Property I, L.P., Atlanta, GA (US)

(72) Inventors: Dongho Kim, Livermore, CA (US); Ioannis Broustis, Basking Ridge, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/217,693

(22) Filed: Mar. 30, 2021

(65) Prior Publication Data
US 2022/0321414 A1 Oct. 6, 2022

(51) Int. Cl.
| | |
|---|---|
| H04L 12/24 | (2006.01) |
| H04L 41/08 | (2022.01) |
| H04L 41/046 | (2022.01) |
| H04L 41/0816 | (2022.01) |
| H04W 24/10 | (2009.01) |

(Continued)

(52) U.S. Cl.
CPC ........ *H04L 41/0886* (2013.01); *H04L 41/046* (2013.01); *H04L 41/0816* (2013.01); *H04L 41/0823* (2013.01); *H04L 41/14* (2013.01); *H04W 24/10* (2013.01)

(58) Field of Classification Search
CPC ............... H04L 41/0886; H04L 41/046; H04L 41/0816; H04L 41/0823; H04L 41/14; H04W 24/10
See application file for complete search history.

(56) References Cited

U.S. PATENT DOCUMENTS

2016/0350095 A1* 12/2016 Ramachandran ..... H04L 41/082
2017/0289060 A1* 10/2017 Aftab .................. H04L 41/5054

(Continued)

OTHER PUBLICATIONS

Sandeep Shah, Mar. 26, 2020. "CM Notification Support in ONAP" Retrieve d on Oct. 6, 2022. <https://wiki.onap.org/display/DW/CM+Notification+Support+in+ONAP> (Year: 2020).*

(Continued)

*Primary Examiner* — Brian J. Gillis
*Assistant Examiner* — Juan C Turriate Gastulo
(74) *Attorney, Agent, or Firm* — Amin, Turocy & Watson LLP

(57) ABSTRACT

The described technology is generally directed towards an automation agent for network equipment configuration. The automation agent can be incorporated into a network automation platform. The network automation platform can include, inter alia, a communication channel, such as a data movement as a platform (DMaaP) communication channel, which is used by various components of the network automation platform. The disclosed automation agent can monitor the communication channel for network equipment configuration communications generated by other components of the network automation platform. In response to a network equipment configuration communication, the automation agent can create an interface update file comprising the updated interface configuration data, and send the interface update file to a network equipment configuration update service for deployment to the network equipment.

20 Claims, 9 Drawing Sheets

(51) Int. Cl.
*H04L 41/0823* (2022.01)
*H04L 41/14* (2022.01)

(56) References Cited

U.S. PATENT DOCUMENTS

| | | | |
|---|---|---|---|
| 2019/0028374 A1* | 1/2019 | Xu | H04L 45/64 |
| 2020/0067776 A1* | 2/2020 | Williams | H04L 41/0876 |
| 2020/0136929 A1* | 4/2020 | Takla | H04L 43/08 |
| 2020/0145417 A1* | 5/2020 | Larish | H04L 63/20 |
| 2020/0195501 A1* | 6/2020 | Shenoy | H04L 41/0863 |
| 2021/0176142 A1* | 6/2021 | Clarke | H04L 41/5025 |
| 2021/0329004 A1* | 10/2021 | Xing | H04L 41/0213 |
| 2022/0021470 A1* | 1/2022 | Callard | G06N 3/0454 |
| 2022/0286360 A1* | 9/2022 | Gali | H04L 41/40 |

OTHER PUBLICATIONS

ONAP, Nov. 29, 2020. Retrieved on Jan. 11, 2023 from <https://web.archive.org/web/20201129072153/https://docs.onap.org/projects/onap-policy-parent/en/latest/architecture/architecture.html> (Year: 2020).*

"Model-driven DMaaP agent," https://jira.onap.org/browse/SDNC-887, 2 pages.

* cited by examiner

AUTOMATION AGENT FOR NETWORK EQUIPMENT CONFIGURATION

TECHNICAL FIELD

The subject application is related to fifth generation (5G) and subsequent generation cellular communication systems, e.g., to intelligent dual-connectivity in 5G non-standalone mode.

BACKGROUND

Network operators, such as AT&T Corporation and others, generally operate a core network infrastructure that interacts with distributed radio access network (RAN) equipment. The RAN equipment includes, e.g., cellular network base stations and antennas deployed in the field. When a user makes a telephone call on their cellular telephone (also referred to as a user equipment), the user equipment communicates wirelessly with RAN equipment, and the RAN equipment communicates with the network operator's core network equipment. The core network equipment may then communicate with different RAN equipment, which can in turn communicate with destination user equipment at the other end of the call.

Network operators configure and reconfigure the RAN equipment as needed to cooperate well with the core network equipment. A variety of technologies have been developed to assist with RAN equipment configuration. One such technology is the "yet another next generation" (YANG) data modeling language. YANG is a standards-based data modeling language used to create device configuration requests. The device configuration requests can take the form of a "yang file," which includes device configuration information. Another such technology is the network configuration (NETCONF) protocol. NETCONF is a standards-based and extensible markup language (XML) encoded protocol that provides the transport to communicate yang files, e.g., from core network equipment to RAN equipment.

While technologies such as NETCONF and YANG have improved network operators' operations to configure and reconfigure RAN equipment, there is a need in the industry to further streamline RAN equipment configuration. In particular, current automation approaches do not function in the context of network automation platforms used by today's network operators. Example network automation platforms include, inter alia, platforms conforming to the various "open network automation platform" (ONAP) standards.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
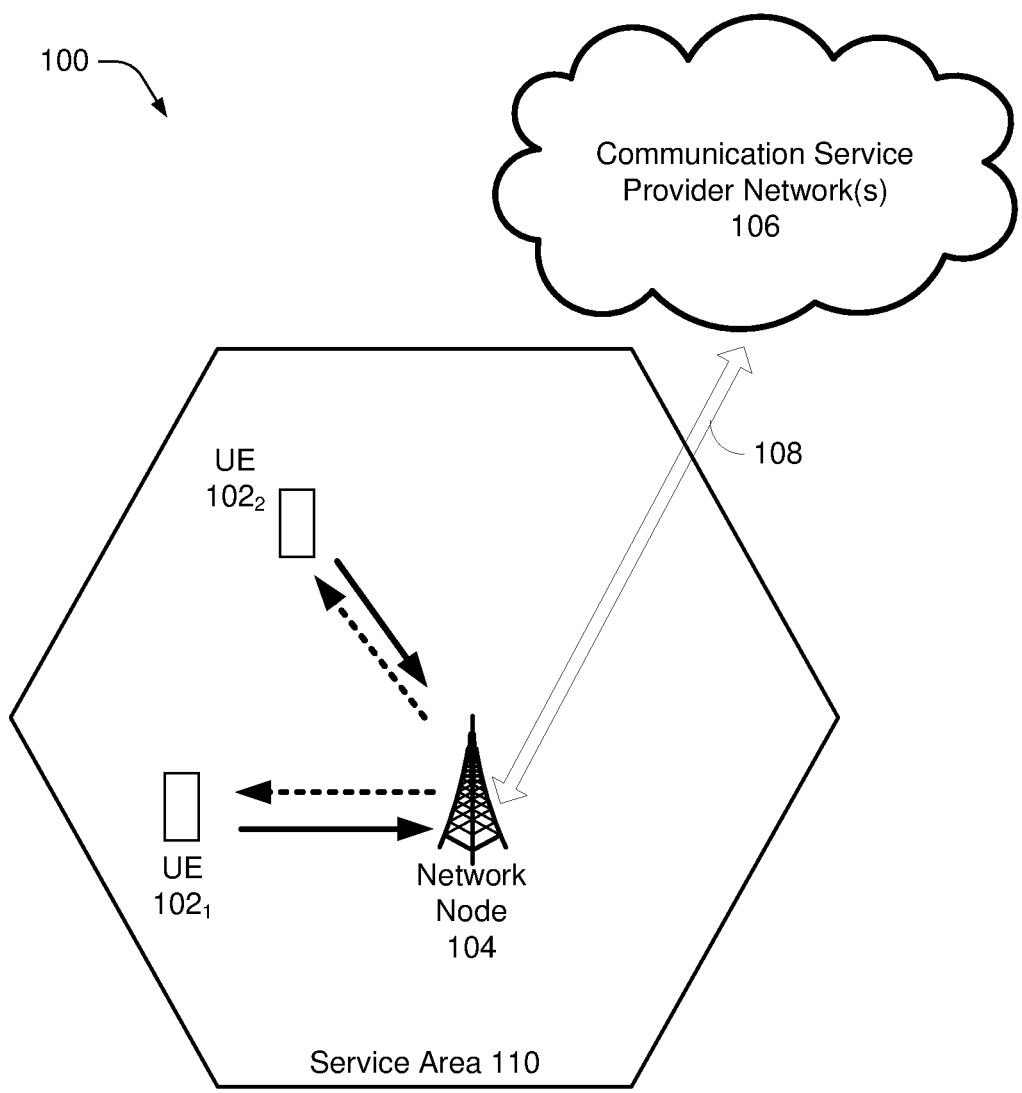
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards an automation agent for network equipment configuration, and corresponding methods, devices, and computer readable media. The automation agent can be incorporated into a network automation platform. The network automation platform can include, inter alia, a communication channel, such as a data movement as a platform (DMaaP) communication channel, which is used by various components of the network automation platform. The disclosed automation agent can monitor the communication channel for network equipment configuration communications generated by other components of the network automation platform. Example network equipment configuration communications can include, e.g., updated interface configuration data for RAN equipment. In response to a network equipment configuration communication, the automation agent can create an interface update file comprising the updated interface configuration data, and the automation agent can send the interface update file to a network equipment configuration update service of the network automation platform. The network equipment configuration update service can then deploy the interface update file to the RAN equipment. Further aspects and embodiments are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 5G, or other next generation networks, the disclosed aspects are not limited to a 5G implementation, and/or other network next generation implementations, as the techniques can also be applied, for example, in third generation (3G), or fourth generation (4G) systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors or service areas, such as service area 110, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
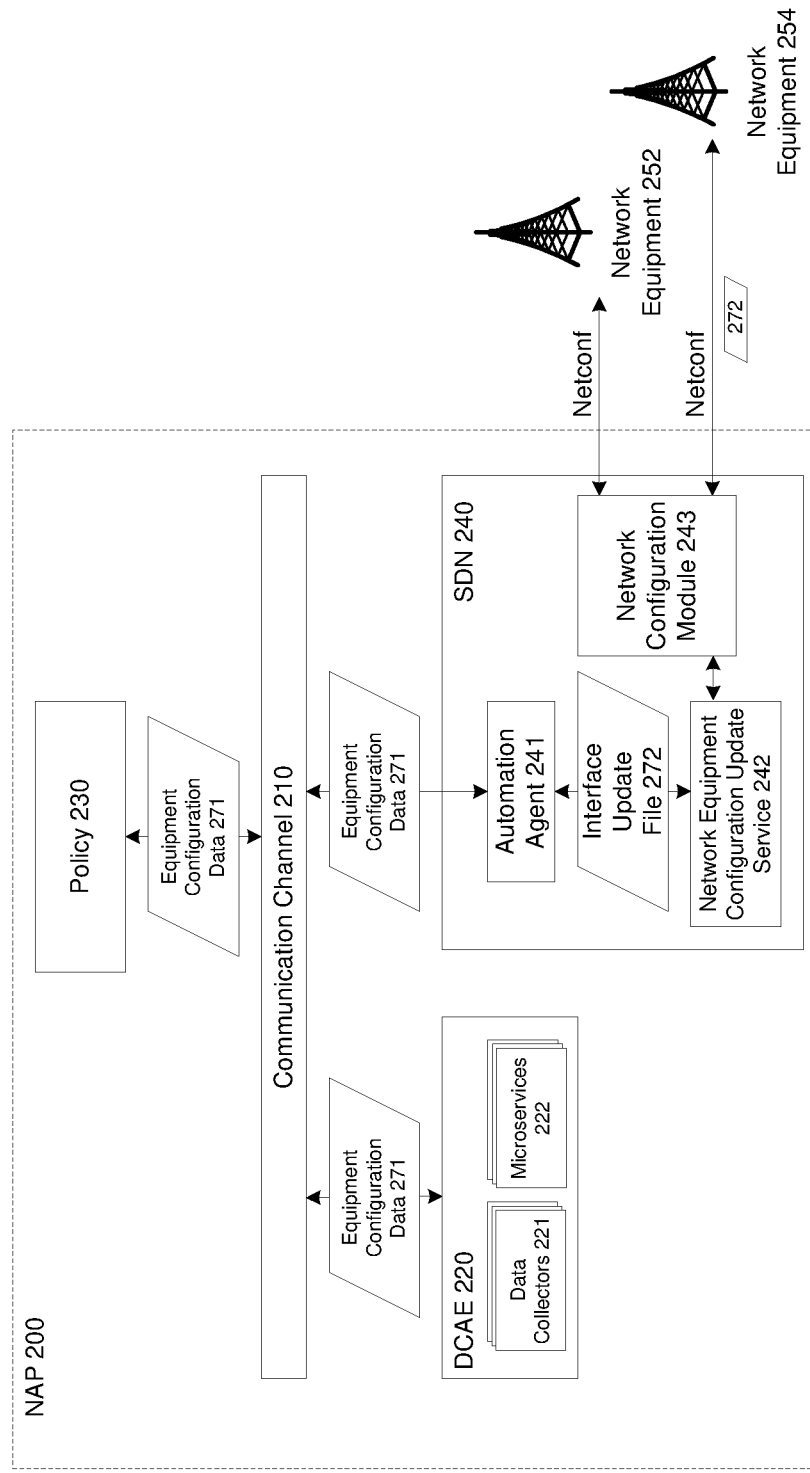
FIG. 2 illustrates an example network automation platform comprising an automation agent, in accordance with various aspects and embodiments of the subject disclosure.

FIG. 2 illustrates an example network automation platform comprising an automation agent, in accordance with various aspects and embodiments of the subject disclosure. The example network automation platform (NAP) 200 includes a communication channel 210, a data collection, analytics and events component (DCAE) 220, a policy component 230, and a software defined network controller (SDN) 240. The DCAE 220 comprises data collectors 221 and microservices 222. The SDN 240 comprises an automation agent 241, a network equipment configuration update service 242, and a network configuration module 243. FIG. 2 furthermore illustrates example network equipment 252, 254 which can be configured by the NAP 200 as disclosed herein.

The NAP 200 illustrated in FIG. 2 can be included in communication service provider network(s) 106 introduced in FIG. 1, and the network equipment 252, 254 in FIG. 2 can comprises instances of a network node 104 introduced in FIG. 1. In some embodiments, the NAP 200 can be configured according to any of the various open network automation platform (ONAP) standards. As such, the NAP 200 can include additional components, not illustrated in FIG. 2. In an ONAP embodiment, the communication channel 210 may be referred to as a data movement as a platform (DMaaP) component or service. The network equipment configuration update service 242 may be referred to as a representational state transfer configuration service (RESTCONF).

In general, with reference to FIG. 2, the data collectors 221 can be configured to collect data from network equipment 252, 254, and the microservices 222 can be configured to analyze the collected data. The analysis performed by microservices 222 can identify problems or potential improvements in the configuration of one or more of the network equipment 252, 254. The microservices 222 can be configured to generate equipment configuration data 271 which addresses the identified problems or improvements. The microservices 222 can publish the equipment configuration data 271 to the communication channel 210.

Policy 230 can be configured to check the equipment configuration data 271 to vet the equipment configuration data 271, ensuring that equipment configuration data 271 does not abrogate any network policies. Policy 230 can then republish the vetted equipment configuration data 271 to the communication channel 220, or policy 230 can publish an approval of the equipment configuration data 271 to the communication channel 220.

By employing an automation agent 241, the SDN 240 can automatically configure the network equipment 252 and/or 254 according to equipment configuration data 271. The automation agent 241 can be configured to monitor the communication channel 220 for equipment configuration data 271. When equipment configuration data 271 is published, e.g., by DCAE 220 or by policy 230, the automation agent 241 can automatically convert the published equipment configuration data 271 into an interface update file 272 and provide the interface update file 272 to network equipment configuration update service 242. In some embodiments the interface update file 272 can comprise a yang file. Network equipment configuration update service 242 can deploy the interface update file 272 via network configuration module 243 to appropriate network equipment, e.g., to network equipment 254. The network configuration module 243 can be configured to use appropriate protocols, e.g., a network configuration (NETCONF) protocol, to interact with network equipment 252, 254.

The network equipment 252, 254 can be adapted to receive interface update files according to the network configuration protocol. For example, network equipment 254 can receive the interface update file 272. In response to receiving the interface update file 272, the network equipment 254 configure itself according to the interface update file 272. The network equipment 252, 254 can comprise "northbound" interfaces for interactions with NAP 200. In some embodiments, the interface update file 272 can include updates to such northbound interfaces. Therefore, for example, the network equipment 254 can configure its northbound interface according to the received interface update file 272.

The network equipment 254 can be configured to send a return communication, e.g., a confirmation that the interface update file 272 was received and implemented at network equipment 254, to the SDN 240. The automation agent 242 can be configured to automatically publish the return communication to the communication channel 210, thereby informing any subscriber NAP 200 components of the network equipment 254 status.

In some embodiments, the automation agent 241 can also be configured to facilitate NAP 200 information gathering operations, to gather information from network equipment 252 and/or 254. For example, a component of the NAP 200, such as DCAE 220, can publish a network equipment parameter read request to the communication channel 210. The automation agent 241 can be configured to subscribe to such read requests and to enable automated deployment of the read requests to network equipment 252, 254. The automation agent 241 can receive the published read request and send the read request to the network equipment configuration update service 242, in order to deploy the read request to the network equipment identified in the read request, e.g., network equipment 252. The network equipment 252 can be configured to receive and respond to the read request, by sending a return communication to SDN 240. The automation agent 241 can be configured to receive the return communication via the network equipment configuration update service 242, and the automation agent 241 can automatically publish the return communication via the communication channel 210. In the case of a network equipment parameter read request, the return communication can include network equipment parameters. Any component of the NAP 200, e.g., policy 230 or the DCAE 220, can subscribe to such return communications in order to receive and use the information published by the automation agent 241.

In some embodiments, the automation agent 241 can comprise a generic DMaaP agent for NETCONF devices such as 252, 254 connected to an OpenDaylight (ODL) type SDN 240. An ODL SDN can provide, via network equipment configuration update service 242 and network configuration module 243, a generic framework to configure northbound (N/B) interfaces for any type of NETCONF devices via a model-driven approach. Embodiments of this disclosure can supplement an ODL SDN with an automation agent 241 that provides a generic framework for the DMaaP interface to the communication channel 210. The DMaaP interface is a standard communication channel for ONAP/ECOMP (enhanced control, orchestration, management and policy) technologies, and the DMaaP interface can be leveraged for embodiments of this disclosure. In general, DMaaP provides a Kafka type messaging system in which components can publish topics and/or subscribe to topics, thereby receiving published information relating to the subscribed topics.

Embodiments can include a bootstrapping mechanism for a new NETCONF device, e.g., network equipment 252 or 254. Embodiments can furthermore include mechanisms to read and write parameters for any type of NETCONF device. Supporting any type of NETCONF device can be beneficial, since NETCONF is a de facto industry standard and is being adopted in RAN standards, such as E/// Open API and O1 in O-RAN (Open RAN).

In another aspect, the automation agent 241 can be configured to translate protocols between DMaaP and the southbound interface of an ODL SDN for NETCONF devices. Such a DMaaP automation agent 241 can receive a message from a DMaaP message router (e.g., the communication channel 210) and can call a function in the interface of the ODL SDN to configure or retrieve parameters of NETCONF devices. The DMaaP automation agent 241 can get a result returned from such call from the ODL SDN, and the DMaaP automation agent 241 can forward the result to the DMaaP message router.

One way to realize such a DMaaP automation agent 241 is to build a device-specific automation agent 241. For example, a NETCONF device A can have a set of attributes A.attrib, and a device-specific automation agent 241 can define DMaaP message fields based on A.attrib. Such an automation agent 241 can compose a functional call for the ODL SDN based on specific attribute names from a DMaaP message, e.g., from equipment configuration data 271. However, such a device-specific DMaaP automation agent 241 can be used for a specific NETCONF device, while the ODL SDN 240 has the power to support other NETCONF devices thanks to its generic framework. Therefore, a device specific DMaaP automation agent 241 can present implementation difficulties in supporting any type of NETCONF devices.

Another approach to realize a DMaaP automation agent 241 is to implement a generic DMaaP automation agent 241, wherein "generic" refers to its ability to support any type of NETCONF device. DMaaP messages such as equipment configuration data 271 can be defined generically, and the DMaaP automation agent 241 can us a generic approach to convert such messages for deployment via the interface of the ODL SDN 240. Device specific information can be handled in a generic string format in DMaaP messages (such as equipment configuration data 271) and a generic DMaaP automation agent 241 can be configured to add such information to a generic part of the interface of the ODL SDN 240 to compose a whole function call of the ODL SDN 240.

Embodiments can support a vendor-neutral standard interface to network equipment 252, 254, e.g., vendor-neutral A1/O1 interfaces in O-RAN. NETCONF can be used for O1 and can also be used for E/// Open API. Generic DMaaP automation agents 241 do not require redundant effort to support DMaaP for different types of network equipment 252, 254 devices. Embodiments can therefore leverage the cost-effective advantage of model driven approaches such as used in ODL type SDNs.

Figure 3:
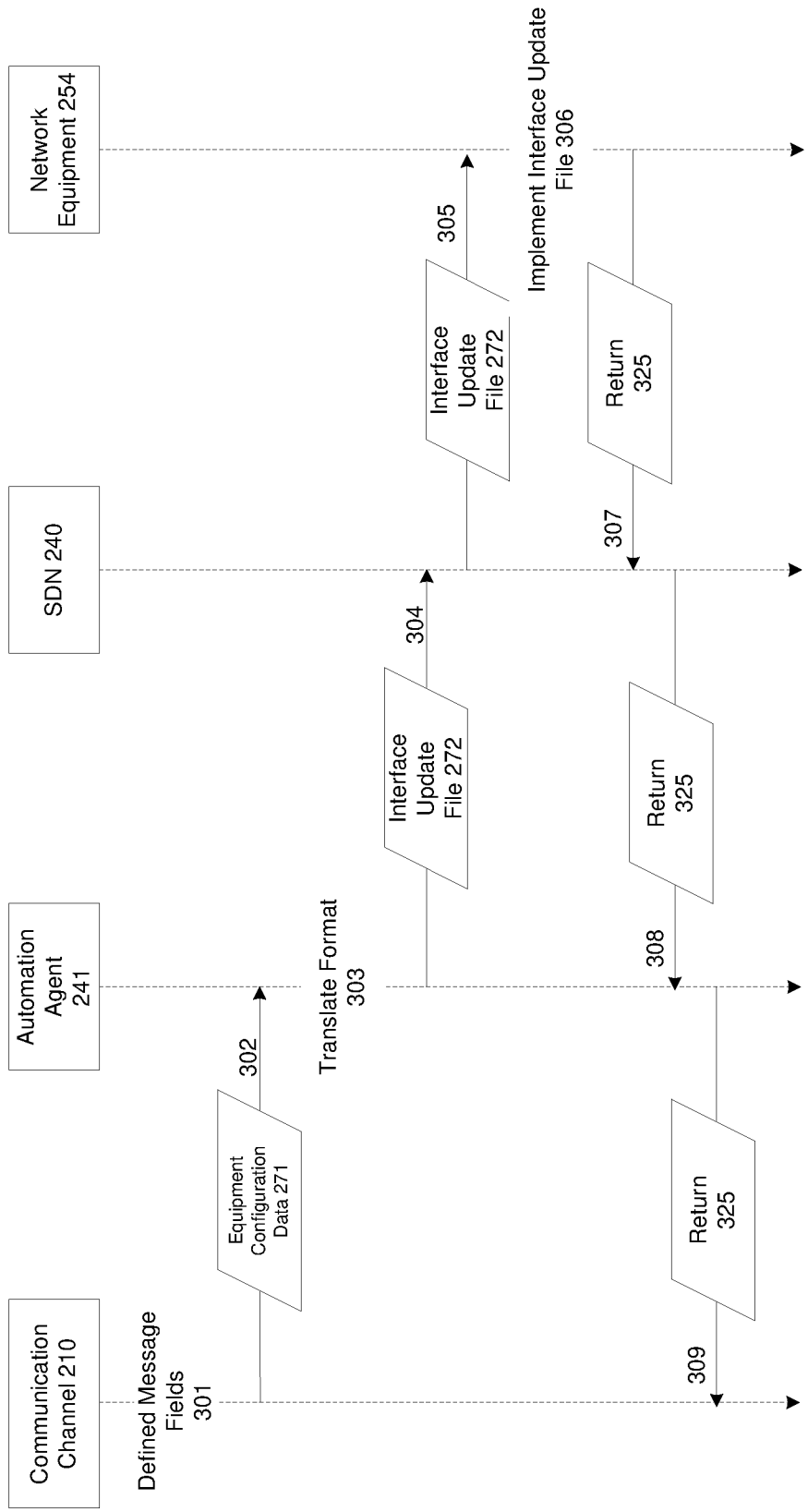
FIG. 3 illustrates an example message flow that uses an automation agent to update a network equipment configuration, in accordance with various aspects and embodiments of the subject disclosure.

FIG. 3 illustrates an example message flow that uses an automation agent to update a network equipment configuration, in accordance with various aspects and embodiments of the subject disclosure. FIG. 3 illustrates interactions between components introduced in FIG. 2, including communication channel 210, automation agent 241, SDN 240 and network equipment 254.

In an example embodiment according to FIG. 3, communication channel 210 message fields can be defined 301, e.g., for equipment configuration data 271. In some embodiments, the message fields can be defined according to attribute names of network equipment 254. An example of equipment configuration data 271 is below:

```
{
    "requestID": "xxx-yyy-zzz-xx",
    ...
    "pZeroNominalPucch" : "–100",
    "pZeroNominalPusch" : "–98",
    ...
} }
```

In other embodiments, the message fields can be defined generically to support any network equipment. Examples of equipment configuration data 271 that uses generically defined message fields are provided in connection with FIGS. 4-6. At 302, the communication channel 210 can transport equipment configuration data 271 to automation agent 241.

At 303, the automation agent 241 can be configured to translate equipment configuration data 271 in order to create an interface update file 272. In an embodiment, the interface update file 272 format can comprise a YANG format which can be used for ODL. For example, Java code can be used to translate an aspect of the above equipment configuration data 271 as follows:
. . . ("pZeroNominalPucch", "–100")
An example yang file can include the following:

```
"ietf-restconf:yang-patch" : {
  "patch-id" : "0",
  "edit" : [ {
    "edit-id" : "edit1",
    "operation" : "merge",
    "target" : "/vendor-lrat-enb:ENodeBFunction[vendor-lrat-enb:id='1']/vendor-lrat-
  enb:EUtranCellFDD[vendor-lrat-enb:id='WTC1EENB12LA']",
    "value" : {
      "EUtranCellFDD" : {
        "id":"WTC1EENB12LA",
        "pZeroNominalPucch": "–100",
        "pZeroNominalPusch": "–98"
} } } ] } }
```

At 304, the automation agent 241 can provide the interface update file 272, e.g., the yang file, to the SDN 240, e.g., to the network equipment configuration update service 242 of the SDN 240. The network equipment configuration update service 242, such as RESTCONF, can be configured to listen to a port, and when a request is received via the port, it deploys the request via a network configuration module 243. According to embodiments of this disclosure, the automation agent 241 can provide the interface update file 272 to a port used by the network equipment configuration update service 242, and the network equipment configuration update service 242 need not be modified to accommodate the automation agent 241. At 305, the SDN 240 can employ the network configuration module 243 (see FIG. 2) to provide the interface update file 272 to the appropriate network equipment 254.

At 306, the network equipment 254 can implement the interface update file 272, e.g., by configuring an interface according to the interface update file 272. The network equipment 254 can include, e.g., equipment at a RAN node. Alternatively, the network equipment 254 can be any other network device, e.g., a simple network management protocol (SNMP) switch type device or any other device. At 307, the network equipment 254 can send return 325 to SDN 240. The return 325 can include data pertaining to success or failure of installing the interface update file 272. At 308, the SDN 240 can provide the return 325 to the automation agent 241, and at 309, the automation agent 241 can automatically publish the return 325, or aspects thereof, to the communication channel 210. Any subscriber, e.g., policy 230 or DCAE 220, to information such as return 325 can optionally receive the return 325 via the communication channel 210.

In a generic embodiment, the automation agent 241 is configured to conduct translations for any types of NETCONF devices. In the generic embodiment, specific attribute names need not used in equipment configuration data 271. Instead, a publisher of the equipment configuration data 271 (e.g. a microservice 222) provides device-specific details, and the automation agent 241 handles only the generic part(s) of the equipment configuration data 271. Further examples are provided below in connection with FIGS. 4-6.

Figure 4:
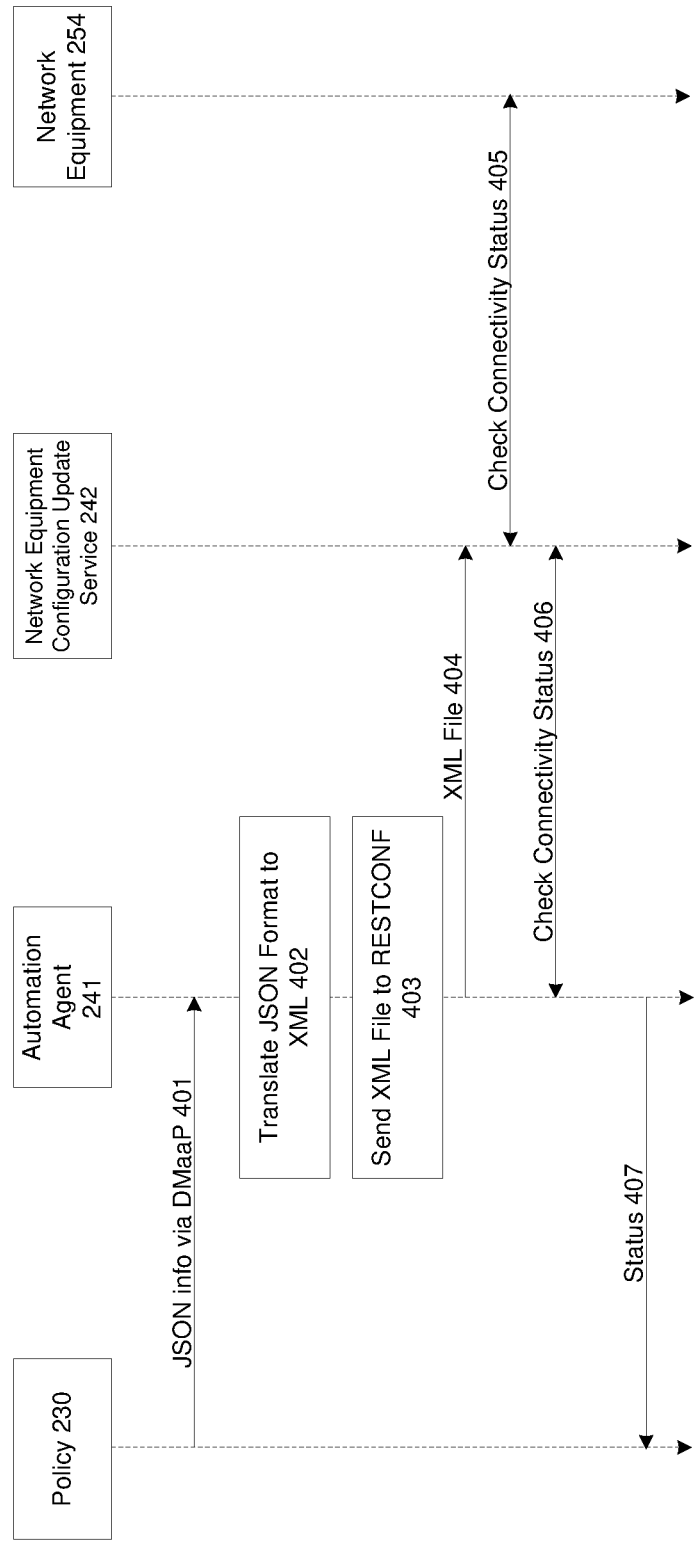
FIG. 4 illustrates an example message flow for a bootstrapping operation, in accordance with various aspects and embodiments of the subject disclosure.

FIG. 4 illustrates an example message flow for a bootstrapping operation, in accordance with various aspects and embodiments of the subject disclosure. FIG. 4 illustrates interactions between components introduced in FIG. 2, including policy 230, automation agent 241, network equipment configuration update service 242, and network equipment 254.

In an example embodiment according to FIG. 4, the desired outcome is a connection between the NAP 200 and a NETCONF device, such as network equipment 254. Bootstrapping can help a microservice 222 identify a new NETCONF device 254, via a communication channel 210 such as DMaaP, in case the new device 254 appears in the RAN network. Bootstrapping does not, however, provide a mechanism to configure or retrieve parameter values of a NETCONF device 254. Device configuration and parameter retrieval are described further with reference to FIG. 5 and FIG. 6.

At 401, policy 230 can provide JavaScript Object Notation (JSON) information, via the DMaaP communication channel, to the automation agent 241. For example, policy 230 can provide the below example information to the automation agent 241:

```
{
  - common headers (e.g. reqID, timestamp, origin, etc.)
  "Payload": [ {
    "node-id": "node1",
```

```
    "host": "127.0.0.1",
    "port": "2022",
    "username": "aaa",
    "password": "bbb",
    "tcp-only": "false",
    .... }, {...},..... ]
}
```

The payload information can comprise an array, and the automation agent 241 can handle each item one by one. Upon receipt of the JSON information, the automation agent 241 can be configured, at 402, to translate the JSON format to XML, and at 403, to send the resulting XML file to the network equipment configuration update service 242, which can be implemented as RESTCONF. Below is an example translation of the JSON format to XML:

```
<node xmlns="urn:TBD:params:xml:ns:yang:network-topology">
<node-id> node1</node-id>
<host xmlns="urn:opendaylight:netconf-node-topology"> 127.0.0.1</host>
...
</node>
```

The below example can be used for operation 403, to send the resulting XML file to the network equipment configuration update service 242:

```
sendcurl -i -X PUT -d @xxx.xml
--header "Accept: application/xml"
--header "Content-Type: application/xml"
http://ODL_IP_addr:ODL_port/restconf/config/network-topology:network-
topology/topology/topology-netconf/node/node1
```

Operation 404 illustrates transmission of the XML file to the network equipment configuration update service 242. Subsequent to receipt of the XML file, the network equipment configuration update service 242 can be configured to check connectivity status 405. Checking connectivity status 405 can include checking connectivity with a NETCONF device, such as network equipment 254. This can be done n times, where n can be configured in a config file. Checking connectivity status can furthermore include check connectivity status 406 communications with the automation agent 241, as illustrated in FIG. 4. The below example code can be used in connection with operations 405 and/or 406:

```
curl -s -v -X GET
--header "Accept: application/json"
--header "Content-Type: application/json"
http://ODL_IP_addr:ODL_port/restconf/operational/network-topology:network-topology/
```

At 407, the automation agent 241 can be configured to return status information to policy 230, again, via the communication channel 210 such as DMaaP. The below example code can be used by automation agent 241 in connection with operation 407:

```
{
 "requestID": "6883ed53-6c7f-4e8c-818e-7c31cb202237",
 "origin": "SDN-R", "timestamp": "2019-03-26T02:31:00.042+00:00",
 "action": "netconf_resp",
 "returnStatus": "",
}
```

Figure 5:
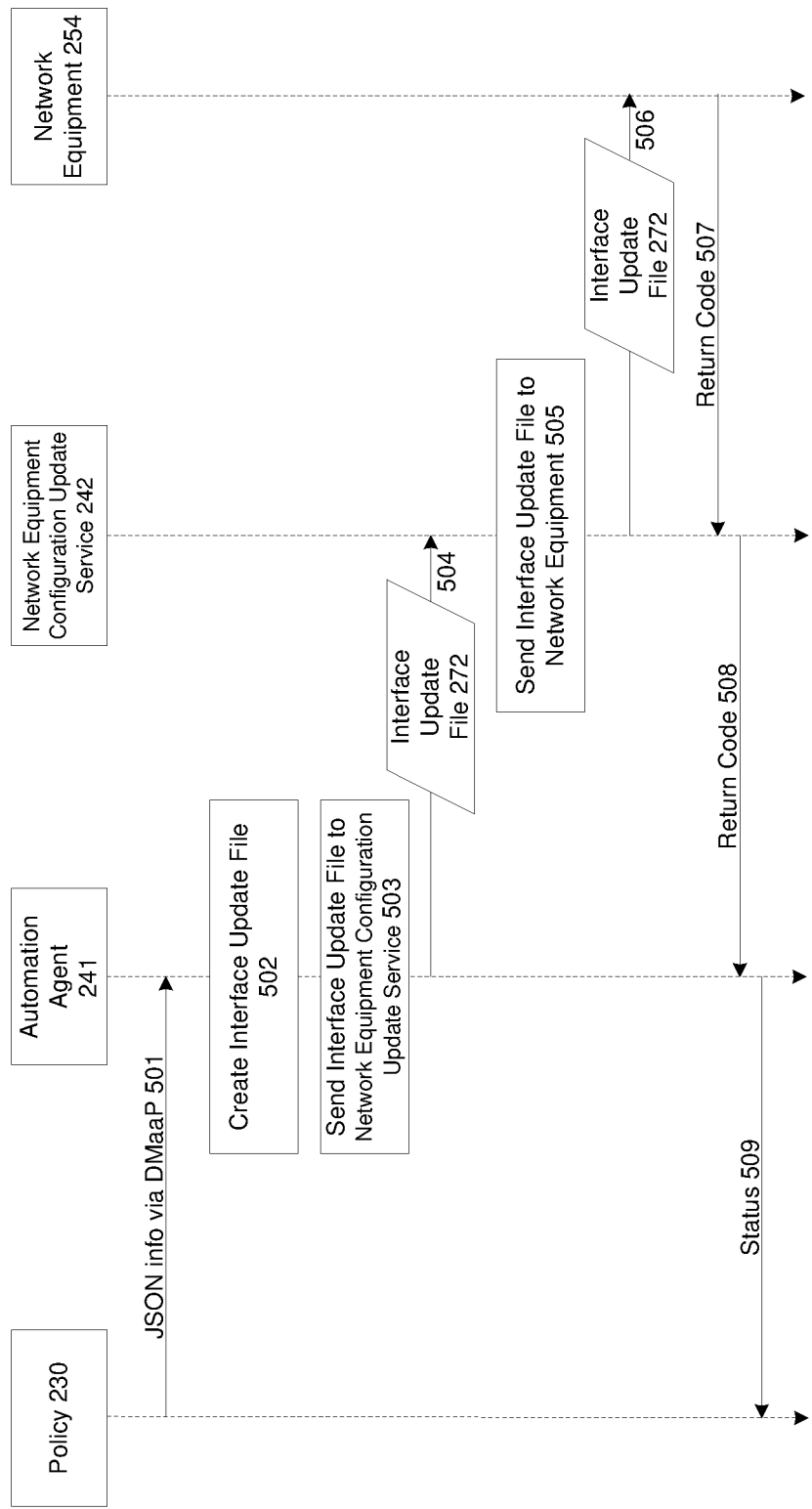
FIG. 5 illustrates an example message flow to configure network equipment parameters, in accordance with various aspects and embodiments of the subject disclosure.

FIG. 5 illustrates an example message flow to configure network equipment parameters, in accordance with various aspects and embodiments of the subject disclosure. FIG. 5 illustrates interactions between components introduced in FIG. 2, including policy 230, automation agent 241, network equipment configuration update service 242, and network equipment 254.

In an example embodiment according to FIG. 5, the desired outcome is configuring network equipment, such as network equipment 254, with one or more new parameters. The new parameters can originate at a microservice 222, which can publish the new parameters to the communication channel 210. The new parameters can be retrieved from the communication channel 210 and vetted by policy 230, and policy 230 can republish the vetted new parameters to the communication channel 210. The automation agent 241 can receive the vetted new parameters from the communication channel 210 and initiate deployment of the new parameters to network equipment 254 by the SDN 240, namely, by the automation agent 241, the network equipment configuration update service 242, and other components of the SDN 240.

At 501, policy 230 can provide JSON information to automation agent 241 via a communication channel 201 such as DMaaP. JSON information is an example of equipment configuration data 271 introduced in FIG. 2. An example of JSON information is provided below:

```
{
    - common headers (e.g. reqID, timestamp, origin, etc.)
    "Payload": [ {
        "node-id": "node1",
        "yangpath": "yangpath1",
        "editcmd": { {
            "ietf-restconf:yang-patch" : {
                "patch-id" : "0",
                "edit" : [ {
                    "edit-id" : "edit1",
                    "operation" : "merge",
                    "target" : "/vendor-lrat-enb:xxx",
                    "value" : {
                        "EUtranCellFDD" : {
                            "id":"WTC1EENB12LA",
                            "pZeroNominalPucch": "–100"
}}}]}}}, {.... }, ..... ]
}
```

The payload information in the above example can include an array, and the automation agent 241 can be configured to handle array items one by one. Upon receipt of the JSON information, the automation agent 241 can create 502 an interface update file, e.g., a yang file, and send 503 the interface update file to the network equipment configuration update service, wherein the network equipment configuration update service 242 can also be referred to herein as a RESTCONF service. The interface update file 272 can include a portion of the JSON information, e.g.:

```
{
    "ietf-restconf:yang-patch" : {
        "patch-id" : "0",
        "edit" : [ {
            "edit-id" : "edit1",
            "operation" : "merge",
            "target" : "/vendor-lrat-enb:xxx",
            "value" : {
                "EUtranCellFDD" : {
                    "id":"WTC1EENB12LA",
                    "pZeroNominalPucch": "–100"
}}}]}
}
```

The below example code can be used by automation agent 241 in connection with operation 503:

```
curl -s -v -X PATCH
--header "Content-Type: application/yang.patch+json"
-d @edit_parm.yang
http://ODL_IP_addr:ODL_port/restconf/config/network-topology:network-
topology/topology/topology-netconf/node/node1/yang-ext:mount/yangpath1
```

The "curl" command can be used to extract desired information from received JSON information, in order to place that desired information into the interface update file 272. Operation 504 illustrates transmission of the interface update file 272 to the network equipment configuration update service 242. Subsequent to receipt of the interface update file 272, at operation 505 the network equipment configuration update service 242 can send the interface update file 272 to network equipment, e.g., to network equipment 254, using an appropriate configuration update protocol such as NETCONF. Operation 506 illustrates transmission of the interface update file 272 to the network equipment 254. The network equipment 254 can return a return code 507 which indicates implementation status of the interface update file 272 at the network equipment 254. The network equipment configuration update service 242 can receive the return code, or other return information from the network equipment 254, and at operation 508, the network equipment configuration update service 242 can provide the return code to the automation agent 241. At operation 509, the automation agent 241 can provide status information based on the return code, via the communication channel 210 to policy 230 or other subscribing components of the NAP 200. The below example code can be used in connection with operation 509:

```
{
    "requestID": "6883ed53-6c7f-4e8c-818e-7c31cb202237",
    "origin": "SDN-R", "timestamp": "2019-03-26T02:31:00.042+00:00",
    "action": "netconf_resp",
    "returnStatus": "",
}
```

Figure 6:
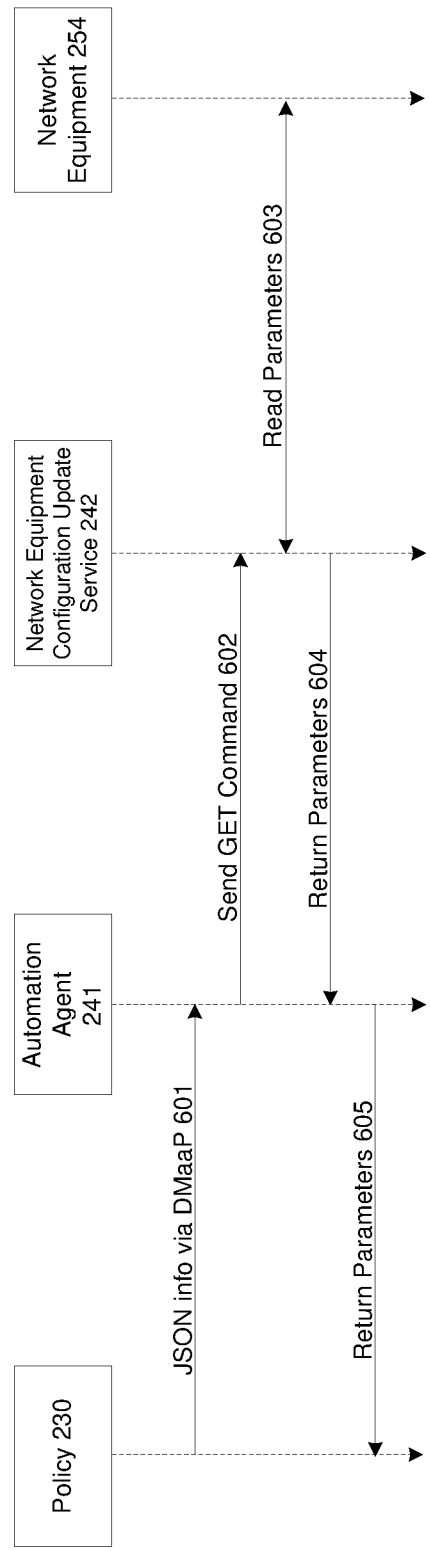
FIG. 6 illustrates an example message flow to read network equipment parameters, in accordance with various aspects and embodiments of the subject disclosure.

FIG. 6 illustrates an example message flow to read network equipment parameters, in accordance with various aspects and embodiments of the subject disclosure. FIG. 6 illustrates interactions between components introduced in FIG. 2, including policy 230, automation agent 241, network equipment configuration update service 242, and network equipment 254.

In an example embodiment according to FIG. 6, the desired outcome is obtaining (reading) parameters in use at network equipment 254. A read request can originate, e.g., at any NAP 200 component, such as microservice 222, and the read request can be published to the communication channel 210 such as the DMaaP. The read request can be vetted by policy 230, and the vetted read request can be republished to the communication channel 210. The vetted read request can then be retrieved from the communication channel 210 by the automation agent 241, and sent by components of the SDN 240, namely, by the automation agent 241, the network equipment configuration update service 242, and other components of the SDN 240, to the network equipment 254. Parameters returned by the network equipment 254 can be received at the network equipment configuration update service 242, which can send the returned parameters to the automation agent 241, which can in turn publish the returned parameters to the communication channel 210 such as the DMaaP communication channel. Any subscriber, e.g., policy 230, can receive the returned parameters published to the communication channel 210. The operations illustrated in FIG. 6 can optionally be performed periodically and continuously, to acquire updated network equipment parameter information that is then available for analysis by any NAP 200 components.

At 601, policy 230 can provide JSON information to the communication channel 210, e.g., DMaaP. Example JSON information is provided below:

```
{
  - common headers (e.g. reqID, timestamp, origin, etc.)
  "Payload": [{
    "node-id": "node1",
    "yangpath": "yangpath1",
  }, {.... }, ..... ]
}
```

The automation agent 241 can be configured to receive the JSON information from the communication channel 210, and generate and send a GET command 602 to the network equipment configuration update service 242. Example code for use in connection with operation 602 is provided below:

```
curl -s -v -X GET
--header "Accept: application/json"
--header "Content-Type: application/json"
http://ODL_IP_addr:ODL_port/restconf/config/network-topology:network-
topology/topology/topology-netconf/node/node1/yang-ext:mount/yangpath1
```

At operation 603, network equipment configuration update service 242 can read parameters 603 at network equipment 254. At operation 604, network equipment configuration update service 242 can return the parameters retrieved from network equipment 254 to the automation agent 241. At operation 605, the automation agent 241 can publish the returned parameters to the communication channel 210, from which any subscriber, e.g., policy 230 or microservice 222, can retrieve the returned parameters. Example code for use in connection with operation 605 is provided below:

```
{
  "requestID": "6883ed53-6c7f-4e8c-818e-7c31cb202237",
  "origin": "SDN-R", "timestamp": "2019-03-26T02:31:00.042+00:00",
  "action": "netconf_resp",
  "returnStatus": "",
  "payload": xxx
}
```

Figure 7:
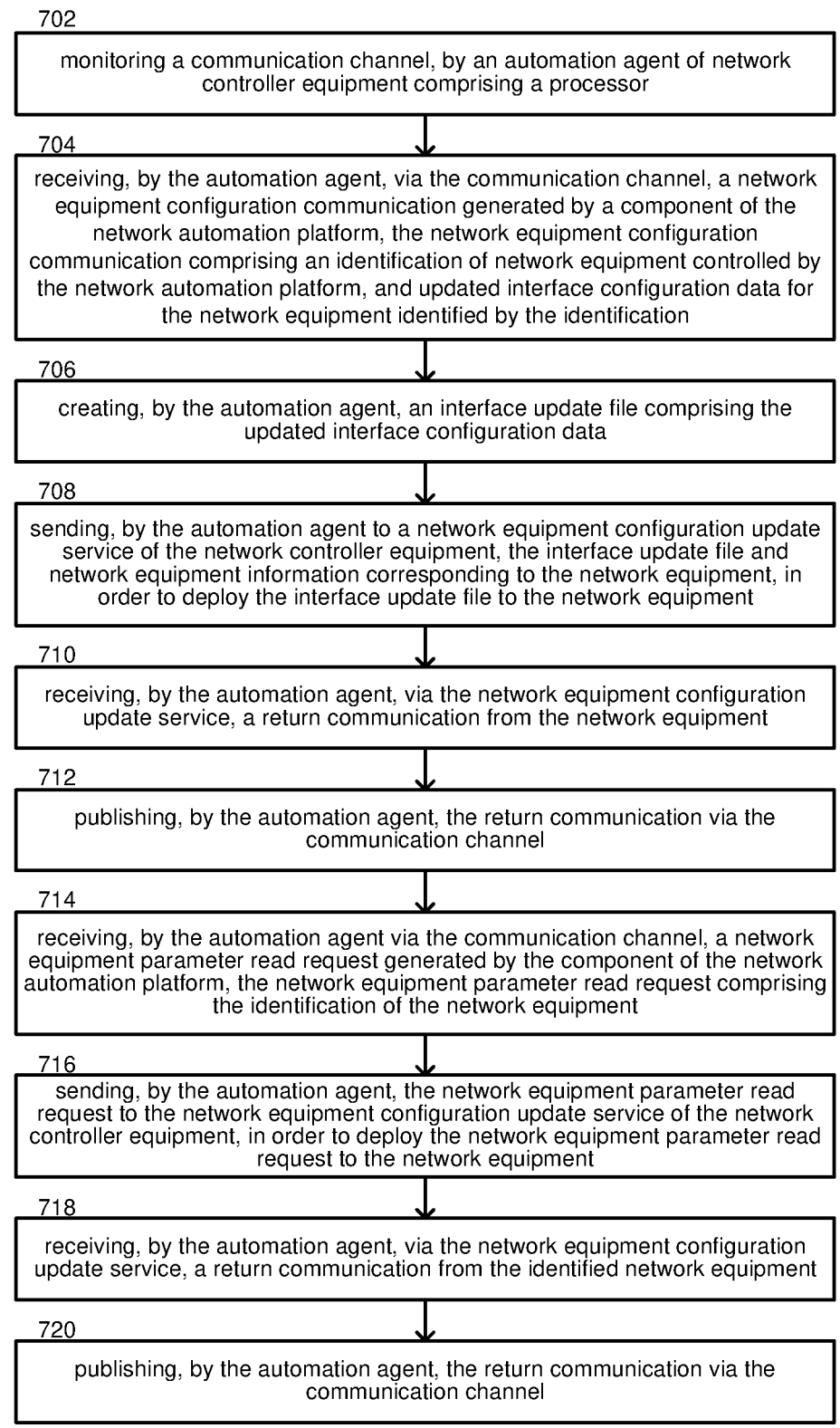
FIG. 7 is a flow diagram representing example operations of an automation agent, in accordance with various aspects and embodiments of the subject disclosure.

FIG. 7 is a flow diagram representing example operations of an automation agent, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by an automation agent 241, illustrated in FIG. 2. Example operation 702 comprises monitoring a communication channel 210, by an automation agent 241 of network controller equipment comprising a processor. The network controller equipment can comprise, e.g., one or more devices that host the SDN 240. The communication channel 210 can support communication between components 220, 230, 240 of a network automation platform 200 comprising the network controller equipment. The communication channel can comprise, e.g., a DMaaP, as described herein.

Example operation 704 comprises receiving, by the automation agent 241, via the communication channel 210, a network equipment configuration communication, e.g., equipment configuration data 271, generated by a component 220 of the network automation platform 200, the network equipment configuration communication comprising an identification of network equipment 254 controlled by the network automation platform 200, and updated interface configuration data for the network equipment 254 identified by the identification. The network equipment configuration communication can be received from a microservice 222 at a DCAE 220 component of the network automation platform 200. The network equipment configuration communication can optionally be vetted by policy 230, and so the network equipment configuration communication may be from the DCAE 220 and via policy 230.

Example operation 706 comprises creating, by the automation agent 241, an interface update file 272 comprising the updated interface configuration data, namely, the updated interface configuration data included in the equipment configuration data 271. The interface update file can comprise a yang file, as described herein.

Example operation 708 comprises sending, by the automation agent 241 to a network equipment configuration update service 242 of the network controller equipment, the interface update file 272 and network equipment information corresponding to the network equipment 254, in order to deploy the interface update file 272 to the network equipment 254. In some examples, the interface update file 272 can include network equipment information and such information need not be separate from the interface update file 272. The network equipment configuration update service can be implemented as a RESTCONF service, as described herein. The network equipment configuration update service can deploy the interface update file 272 to network equipment 254 using a network configuration (NETCONF) protocol. The network equipment 254 to which the interface update file 272 is deployed can comprise, e.g., equipment at a radio access network (RAN) node. The updated interface configuration data, which is incorporated into the interface update file 272 for the network equipment 254, can comprise updated northbound interface configuration data used in connection with NAP 200 control of the network equipment 254.

Example operation 710 comprises receiving, by the automation agent 241, via the network equipment configuration update service 242, a return communication from the network equipment 254. Example operation 712 comprises publishing, by the automation agent 241, the return communication via the communication channel 210. For example, FIG. 5 illustrates publication of status 507 which can include information from a return communication.

Example operation 714, 716, 718, and 720 implement retrieving parameters from network equipment 254 and can optionally be performed independently of the other operations illustrated in FIG. 7. Example operation 714 comprises receiving, by the automation agent 241 via the communication channel 210, a network equipment parameter read request generated by the component, e.g., 222, of the network automation platform 200, the network equipment parameter read request comprising the identification of the network equipment 254. Example parameter read techniques are discussed further in connection with FIG. 6. Example operation 716 comprises sending, by the automation agent 241, the network equipment parameter read request to the network equipment configuration update service 242 of the network controller equipment, in order to deploy the network equipment parameter read request to the network equipment 254. Example operation 718 comprises receiving, by the automation agent 241, via the network equipment configuration update service 242, a return communication from the identified network equipment 254. Example operation 720 comprises publishing, by the automation agent 242, the return communication via the communication channel 210.

Figure 8:
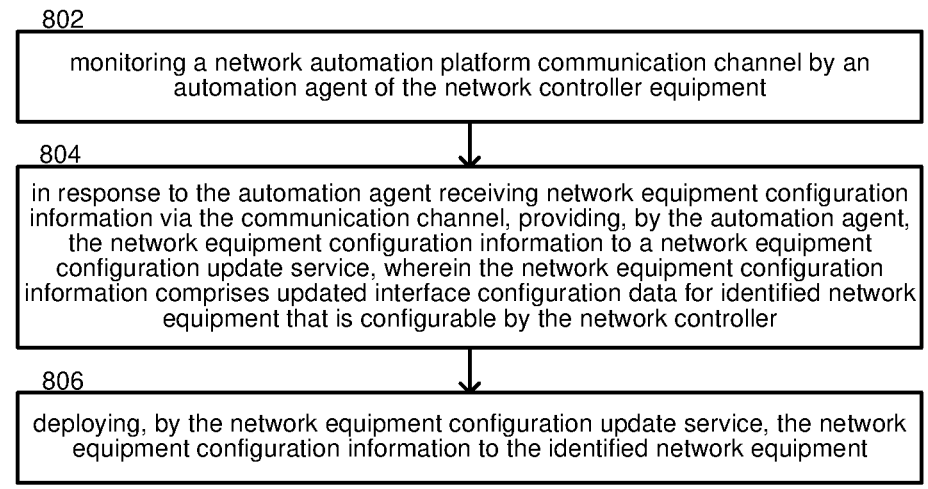
FIG. 8 is a flow diagram representing example operations of a network automation platform comprising an automation agent, in accordance with various aspects and embodiments of the subject disclosure.

FIG. 8 is a flow diagram representing example operations of a network automation platform comprising an automation agent, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network controller equipment, such equipment that implements SDN 240, which is part of a NAP 200, illustrated in FIG. 2. NAP 200 includes a network automation platform communication channel 210, e.g., a DMaaP communication channel. Example operation 802 comprises monitoring the network automation platform communication channel 210 by an automation agent 241 of the network controller equipment.

Example operation 804 comprises, in response to the automation agent 241 receiving network equipment configuration information, e.g., equipment configuration data 271, via the communication channel 210, providing, by the automation agent 241, the network equipment configuration information 271 to a network equipment configuration update service 242. For example, the equipment configuration data 271 can be converted into an interface update file 272, such as a yang file, and the yang file can be provided to network equipment configuration update service 242. The network equipment configuration information 271 can comprise updated interface configuration data for identified network equipment 254 that is configurable by the network controller. The updated interface configuration data for the identified network equipment 254 can comprise updated northbound interface configuration data used in connection with NAP 200 control of the identified network equipment 254.

Example operation 806 comprises deploying, by the network equipment configuration update service 242, the network equipment configuration information (included, for example, in the interface update file 272) to the identified network equipment 254. A yang file can be deployed to the identified network equipment 254 using a NETCONF protocol.

Figure 9:
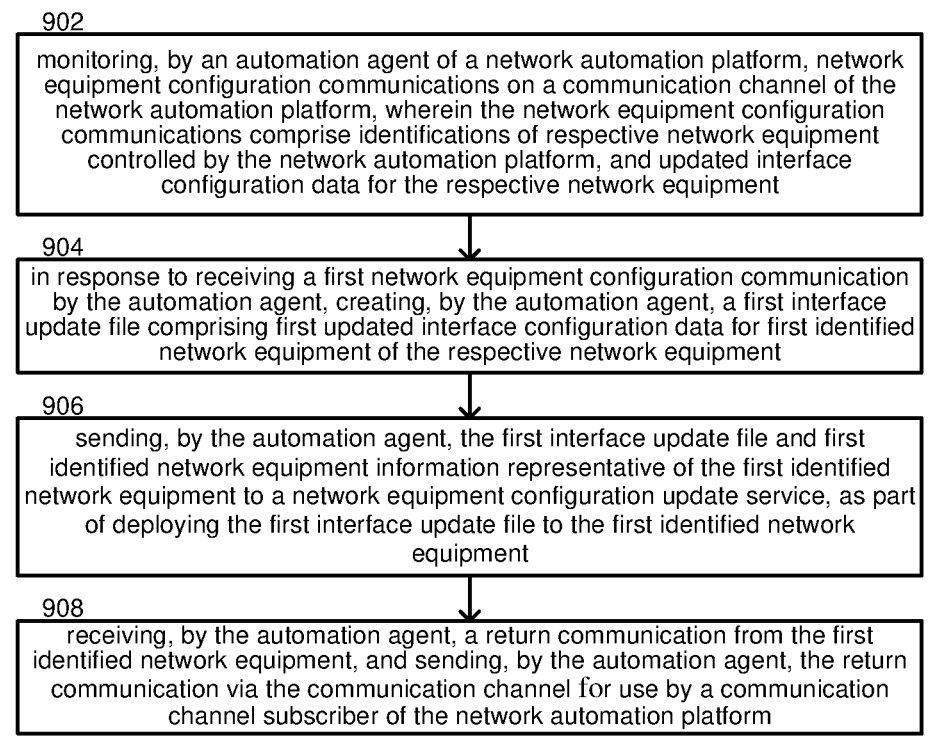
FIG. 9 is a flow diagram representing another set of example operations of an automation agent, in accordance with various aspects and embodiments of the subject disclosure.

FIG. 9 is a flow diagram representing another set of example operations of an automation agent, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by an automation agent 241 in a NAP 200, illustrated in FIG. 2. The NAP 200 can comprise, inter alia, a SDN controller, e.g., SDN 240, and a communication channel 210 such as a DMaaP communication channel. The SDN 240 can comprise, inter alia, the automation agent 241, a network equipment configuration update service 242, and a NETCONF module 243.

Example operation 902 comprises monitoring, by the automation agent 241 of the network automation platform 200, network equipment configuration communications, e.g., communications such as equipment configuration data 271, on a communication channel 210 of the network automation platform 200, wherein the network equipment configuration communications 271 comprise identifications of respective network equipment, e.g., network equipment 252, 254 controlled by the network automation platform 200, and updated interface configuration data for the respective network equipment 252, 254.

Example operation 904 comprises, in response to receiving a first network equipment configuration communication, e.g., equipment configuration data 271, by the automation agent 241, creating, by the automation agent 241, a first interface update file 272 comprising first updated interface configuration data for first identified network equipment 254 of the respective network equipment 252, 254. The first interface update file 272 can comprise a yang file.

Example operation 906 comprises sending, by the automation agent 241, the first interface update file 272 and first identified network equipment information representative of the first identified network equipment, e.g., an identifier of the network equipment 254, which can optionally be included in the interface update file 272, to a network equipment configuration update service 242, as part of deploying the first interface update file 272 to the first identified network equipment 254. The network equipment configuration update service 242 can be configured to deploy the interface update file 272 (e.g., yang file) to the first identified network equipment 254 using a NETCONF protocol, e.g., by using network configuration module 243.

Example operation 908 comprises receiving, by the automation agent 241, a return communication from the first identified network equipment 254, and sending, by the automation agent 241, the return communication via the communication channel 210 for use by a communication channel subscriber (e.g., policy 230 and/or microservice 222) of the network automation platform 200.

Figure 10:
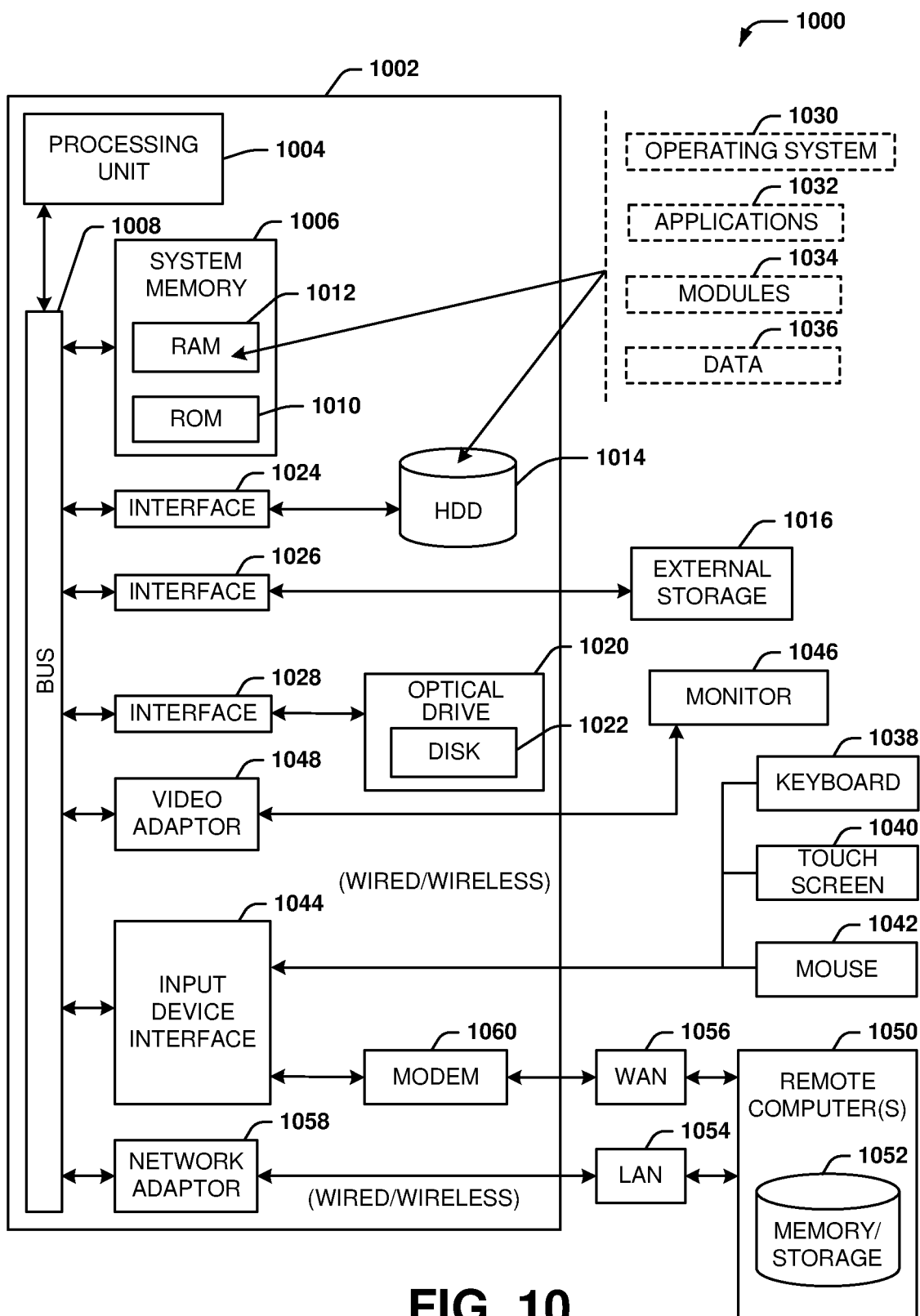
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   obtaining, by a data collector of a network automation platform associated with a core network associated with a cellular communication provider, network equipment data from radio access network equipment controlled via the network automation platform;
   generating, by a microservice of the network automation platform and based on the network equipment data, a network equipment configuration communication comprising an identification of the radio access network equipment and updated interface configuration data for the radio access network equipment, wherein the microservice generates the updated interface configuration data in a generic string format with reference to device-specific attributes of the radio access network equipment;
   publishing, by the microservice, the network equipment configuration communication to a communication channel of the network automation platform;
   monitoring, by an automation agent of the network automation platform, the communication channel;
   receiving, by the automation agent, via the monitoring of the communication channel, the network equipment configuration communication;
   creating, by the automation agent, in response to receiving the network equipment configuration communication, an interface update file comprising the updated interface configuration data, wherein creating the interface update file comprises applying a command to extract the device-specific attributes from the network equipment configuration communication, resulting in extracted attributes;
   including, by the automation agent, the extracted attributes in the interface update file; and
   sending, by the automation agent to a network equipment configuration update service of the network automation platform, the interface update file in order to deploy the interface update file to the radio access network equipment.

2. The method of claim 1, wherein the network controller equipment comprises a software defined network controller.

3. The method of claim 1, wherein the communication channel comprises a data movement as a platform communication channel.

4. The method of claim 1, wherein the microservice is included at a data collection, analytics and events component of the network automation platform.

5. The method of claim 1, wherein the interface update file comprises a yang file.

6. The method of claim 1, wherein the network equipment configuration update service comprises a representational state transfer configuration service.

7. The method of claim 1, wherein the network equipment configuration update service deploys the interface update file using a network configuration protocol.

8. The method of claim 1, wherein the updated interface configuration data for the radio access network equipment comprises updated northbound interface configuration data used in connection with network automation platform control of the radio access network equipment.

9. The method of claim 1, further comprising:
   receiving, by the automation agent, via the network equipment configuration update service, a return communication from the radio access network equipment; and
   publishing, by the automation agent, the return communication via the communication channel.

10. The method of claim 1, further comprising:
   receiving, by the automation agent via the communication channel, a network equipment parameter read request generated by the microservice;

sending, by the automation agent, the network equipment parameter read request to the network equipment configuration update service, in order to deploy the network equipment parameter read request to the radio access network equipment;

receiving, by the automation agent, via the network equipment configuration update service, a return communication from the radio access network equipment; and publishing, by the automation agent, the return communication via the communication channel.

11. The method of claim 1, wherein the interface update file is a first interface update file, wherein the network equipment configuration communication comprises an array, a first item of the array comprising the identification of the radio access network equipment and the updated interface configuration data for the radio access network equipment, and wherein the method further comprises:

creating, by the automation agent, a second interface update file, distinct from the first update file, based on a second item of the array.

12. The method of claim 1, wherein the interface update file comprises a device-specific portion and a generic portion, and wherein the creating of the interface update file comprises:

generating, by the automation agent, the generic portion of the interface update file; and inserting, by the automation agent, the extracted attributes into the device-specific portion of the interface update file via the applying of the command.

13. Network controller equipment, comprising:
a processor; and
a memory that stores executable instructions that, when executed by the processor, facilitate performance of operations, comprising:

obtaining, by a data collector of a network automation platform associated with a core network associated with a cellular communication provider, network equipment data from radio access network equipment controlled by the network automation platform;

generating, by a microservice of the network automation platform and based on the network equipment data, network equipment configuration information comprising an identification of the radio access network equipment and updated interface configuration data for the radio access network equipment, wherein the microservice generates the updated interface configuration data in a generic string format with reference to device-specific attributes of the radio access network equipment;

publishing, by the microservice, the network equipment configuration information to a communication channel of the network automation platform;

monitoring the communication channel by an automation agent of the network automation platform;

in response to the automation agent receiving the network equipment configuration information via the communication channel, creating, by the automation agent, an interface update file comprising the updated interface configuration data for the radio access network equipment, wherein creating the interface update file comprises applying a command to extract the device-specific attributes from the network equipment configuration information, resulting in extracted attributes;

including, by the automation agent, the extracted information attributes in the interface update file;

providing, by the automation agent, the interface update file to a network equipment configuration update service; and deploying, by the network equipment configuration update service, the interface update file to the radio access network equipment.

14. The network controller equipment of claim 13, wherein the network controller equipment comprises a software defined network controller and the network automation platform communication channel comprises a data movement as a platform communication channel.

15. The network controller equipment of claim 13, wherein the command to extract information from the network equipment configuration information comprises a curl command, and wherein the interface update file comprises a yang file created by the automation agent by applying the curl command to the network equipment configuration information, and wherein the automation agent provides the yang file to the network equipment configuration update service.

16. The network controller equipment of claim 15, wherein the network equipment configuration update service deploys the yang file to the radio access network equipment using a network configuration protocol.

17. The network controller equipment of claim 13, wherein the updated interface configuration data for the radio access network equipment comprises updated northbound interface configuration data used in connection with network automation platform control of the radio access network equipment.

18. A non-transitory machine-readable medium, comprising executable instructions that, when executed by a processor, facilitate performance of operations of a network automation platform, comprising:

obtaining, by a data collector of a network automation platform associated with a core network of a cellular communication provider, network equipment data from radio access network equipment controlled by the network automation platform;

generating, by a microservice of the network automation platform and based on the network equipment data, network equipment configuration information comprising an identification of the radio access network equipment and updated interface configuration data for the radio access network equipment, wherein the microservice generates the updated interface configuration data in a generic string format with reference to device-specific attributes of the radio access network equipment;

enabling, by the microservice, the network equipment configuration information to be accessed via a communication channel of the network automation platform;

monitoring, by an automation agent of the network automation platform, network equipment configuration communications on the communication channel, wherein the network equipment configuration communications comprise identifications of respective network equipment controlled by the network automation platform, and updated interface configuration data for the respective network equipment;

in response to receiving, via the monitoring by the automation agent, a first network equipment configuration communication comprising the network equipment configuration information published by the microservice, creating, by the automation agent, a first interface update file for the radio access network equipment, wherein creating the first interface update file comprises applying a command to extract the device-specific attributes from the network equipment configuration information, resulting in extracted attributes;

including, by the automation agent, the extracted attributes in first interface update file; and sending, by the automation agent, the first interface update file and the identification of the radio access network equipment to a network equipment configuration update service of the network automation platform in order to deploy the first interface update file to the radio access network equipment.

19. The non-transitory machine-readable medium of claim 18, wherein the network automation platform comprises a software defined network controller, wherein the software defined network controller comprises the automation agent and the network equipment configuration update service, and wherein the communication channel comprises a data movement as a platform communication channel.

20. The non-transitory machine-readable medium of claim 18, wherein the operations further comprise receiving a return communication from the radio access network equipment, and sending the return communication via the communication channel for use by a communication channel subscriber of the network automation platform.

\* \* \* \* \*